US007001684B2

(12) United States Patent
Doshi et al.

(10) Patent No.: US 7,001,684 B2
(45) Date of Patent: Feb. 21, 2006

(54) SYSTEMS FOR PLANAR FUEL CELL INTERCONNECT UNITS

(75) Inventors: Rajiv Doshi, Torrance, CA (US); Jie Guan, Torrence, CA (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 10/248,505

(22) Filed: Jan. 24, 2003

(65) Prior Publication Data

US 2004/0146773 A1    Jul. 29, 2004

(51) Int. Cl.
*H01M 2/00* (2006.01)
*C25B 9/00* (2006.01)
*B32B 3/04* (2006.01)

(52) U.S. Cl. .......................... 429/34; 429/38; 204/263; 428/122

(58) Field of Classification Search .................. 429/34, 429/38, 37, 32, 31, 36, 35, 12; 428/57, 58, 428/122; 204/263, 275.1
See application file for complete search history.

(56) References Cited

U.S. PATENT DOCUMENTS

| 4,770,955 | A | 9/1988 | Rubi | 429/33 |
|---|---|---|---|---|
| 5,399,442 | A | 3/1995 | Shundo | 429/32 |
| 5,549,983 | A | 8/1996 | Yamanis | 429/32 |
| 5,691,075 | A | 11/1997 | Batawi | 429/32 |
| 2002/0127460 | A1 * | 9/2002 | Pharm et al. | 429/34 |
| 2003/0232230 | A1 * | 12/2003 | Carter et al. | 429/32 |

OTHER PUBLICATIONS

"Multilayer Electrodes for Planar SOFC" by Ivers-Tiffee, W. Wersing and B. Reichhelt Siemens AG, Corporate Research and Development, Otto-Hahn-Ring 6, 8000 Munich 83, FRG; pp. 137-140.
Of Planar SOFC Technology—CFCL's Experience Title: "Electrochemical Society Proceedings" by B. Godfrey, R. Gillespie and K. Foger, Ceramic Fuel Cells Limited, 170 Browns Road, Noble Park, VIC 3174, Australia, pp. 76-87.

* cited by examiner

*Primary Examiner*—Raymond Alejandro
(74) *Attorney, Agent, or Firm*—Sutherland, Asbill & Brennan

(57) ABSTRACT

The fuel cell interconnect units may include a fuel compartment, an air compartment adjacent to the fuel compartment, a plurality of fuel flow fields that are in communication with the fuel compartment and have a fuel outlet, and a plurality of air flow fields that are in communication with the air compartment and have an air outlet.

9 Claims, 5 Drawing Sheets

SYSTEMS FOR PLANAR FUEL CELL INTERCONNECT UNITS

BACKGROUND OF INVENTION

Technical Field

The present invention relates generally to solid oxide fuel cell technology. More specifically, the present invention relates to systems for fuel cell interconnect assemblies and the planar stacking of solid oxide fuel cells.

It has been proposed to use a tubular design for solid oxide fuel cells. In such a design, a number of tubular-cell bundles may be constructed into a large unit.

Because limited use of a high temperature sealant may be involved, the tubular design may offer better reliability than many other planar fuel cell stacks where sealant materials are inevitably used. However, tubular geometry has a disadvantage of low specific power density both in terms of volume and weight. Further, the fabrication process for tubular cells, such as electrochemical vapor deposition, is generally slow and expensive. A more common alternative to the tubular design is a planar design.

Such a fuel cell may resemble a cross flow heat exchanger. In the well known planar designs, interconnects and cells, including a cathode, an electrolyte, and an anode, may be stacked together in order to buildup voltage and power output. In such a planar stack, single cell and interconnect plates must be sealed at each manifold face to avoid fuel and air-cross-leakage. However, availability of reliable high-temperature sealants often presents significant technical issues in such a construction.

Designs requiring the use of less high temperature sealant have been explored. In the known constructions with a circular/annular fuel cell and interconnect, air and fuel may be introduced either from the center or periphery. Such a design reduces, but does not eliminate, the sealing areas. In these constructions with circular or annular cells, the excess air and fuel may be combined along the stack periphery and combusted to release heat. Although the heat may be recovered with a heat exchanger or with a turbine located down stream of the fuel cell exhaust, the opportunity for internal reforming within the fuel cell stack may be lost.

Further, the fuel cells and the interconnects may be connected in-series. The reliability of the entire stack is often dependent on each individual fuel cell component connected in-series. Failure of any component (fuel cell or interconnect) may result in the failure of the entire stack due to the stacking manner of an all-in-series connection. Thus, although the central symmetry minimizes the dependence on sealant materials, the symmetry may make it impossible to form a multiple-cell array. In a construction of planar cells with square geometry, a multiple-cell array also has been attempted. However, such a design experienced significant challenges in practice due to the complexity of the gas manifolding and the extensive sealing required.

Therefore, there remains a desire for a simple, cost effective fuel cell stack design that provides for greater reliability through the elimination all-in-series connection manner of fuel cell components and the need for high-temperature sealant materials. The design should allow for sufficient power density and efficient heat exchange among stack components to allow for internal fuel reformation. The design should be simple and allow for flexible scalability to satisfy different fuel cell applications.

SUMMARY OF INVENTION

The present invention meets the needs described above by providing systems for a fuel cell interconnect unit that may include a fuel compartment, an air compartment adjacent to the fuel compartment, a plurality of fuel flow fields in communication with the fuel compartment, and a plurality of air flow fields in communication with the air compartment. The fuel flow fields may have a fuel outlet, and the air flow fields may have an air outlet. The air compartment and the fuel compartment may share a common side. The fuel flow fields may form an array on the fuel compartment, and the air flow fields may form the same array on the air compartment such that each of the air flow fields aligns with one of the fuel flow fields. An open area may be maintained between each of the fuel flow fields of the array. The air flow fields and the fuel flow fields may be the same shape.

In certain embodiments of the fuel cell interconnect unit, the fuel compartment may be a first cylinder, and the air compartment may be a second cylinder. The common side of the air compartment and fuel compartment may be a first end of the first cylinder and the second cylinder. The fuel flow fields may be fixed to an outer surface of the fuel compartment, which may be a second end of the first cylinder. Similarly, the air flow fields may be fixed to an outer surface of the air compartment, which may be a second end of the second cylinder. Each of the air flow fields and each of the fuel flow fields may be a cylinder. Each of the air outlets may be located in the center of an outer face of each of the cylindrical air flow fields. Each of the fuel outlets may be located in the center of an outer face of each of the cylindrical fuel flow fields. Each of the air flow fields may be in communication with the air compartment via an air orifice. The air orifices may be located in the center of an inner face of each of the cylindrical air flow fields. Each of the fuel flow fields may be in communication with the fuel compartment via a fuel orifice. The fuel orifices may be located in the center of an inner face of each of the cylindrical fuel flow fields.

The present invention further may provide systems for a fuel cell stack that includes a plurality of interconnect units and one or more fuel cells. The interconnect units of the fuel cell stacks may include a fuel compartment, an air compartment adjacent to the fuel compartment, a plurality of fuel flow fields that are in communication with the fuel compartment and have a fuel outlet, and a plurality of air flow fields that are in communication with the air compartment and have an air outlet. At least one of the fuel cells may be adjacent to one of the air flow fields of one interconnect unit and one of the fuel flow fields of the neighboring interconnect unit.

The fuel cell of the fuel cell stack may include an anode that is adjacent to the fuel flow field, a cathode that is adjacent to the air flow field, and an electrolyte that separates the anode from the cathode. The anode and cathode may be made of a porous material. The fuel cell may be held in place between the air flow field of one interconnect unit and the fuel flow field of the neighboring interconnect unit by a bonding agent. In other embodiments, the fuel cell may be held in place by a clamping force.

The air compartment and the fuel compartment of each of the interconnect units of the fuel cell stack may share a common side. The fuel flow fields of each interconnect unit may form an array on the fuel compartment. The air flow fields of each interconnect unit may form the same array on the air compartment such that, within each interconnect unit of the fuel cell stack, each of the air flow fields aligns with one of the fuel flow fields. In other embodiments, an open area may be maintained between each of the fuel flow fields of the array of each interconnect unit, and an open area may be maintained between each of the air flow fields of the array of each interconnect unit.

In other embodiments of the fuel cell stack, the fuel compartment of each interconnect unit may be a first cylinder, and the air compartment of each interconnect unit may be a second cylinder. The common side of each of the interconnect units may be a first end of the first and second cylinder. The fuel flow fields may be fixed to the outer surface of each of the fuel compartments, which may be a second end of the first cylinder. The air flow fields may be fixed to an outer surface of each of the air compartments, which may be a second end of the second cylinder.

In other embodiments of the fuel cell stack, each of the interconnect units further may include an air feed that provides access to the air compartment. The interconnect units also may include a fuel feed that provides access to the fuel compartment. The interconnect units may be stacked such that the air feeds align on a first side of the fuel stack and the fuel feeds align on a second side of the fuel stack. An air manifold running along the first side of the fuel stack may connect to the air feeds. A fuel manifold running along the second side of the fuel stack may connect to the fuel feeds. The fuel cell stack further may include an outer casing that encloses the fuel cell stack and provides an exhaust.

In other embodiments of the fuel stack according to the current invention, the air flow fields and the fuel flow fields may be the same shape. In certain embodiments, each of the air flow fields and each of the fuel flow fields may be a cylinder. In this case, each of the air outlets may be located in the center of an outer face of each of the cylindrical air flow fields, and each of the fuel outlets may be located in the center of an outer face of each of the cylindrical fuel flow fields. Further, within each of the interconnect units, each of the air flow fields may be in communication with the air compartment via an air orifice located in the center of an inner face of each of the cylindrical air flow fields. Similarly, each of the fuel flow fields may be in communication with the fuel compartment via a fuel orifice located in the center of an inner face of each of the cylindrical fuel flow fields.

These and other features of the present invention will become apparent upon review of the following detailed description of the present embodiments of the invention, when taken in conjunction with the drawings and the appended claims.

BRIEF DESCRIPTION OF DRAWINGS

FIGS. 1(a), (b), and (c) are views of an exemplary interconnect unit according to certain embodiments of the present invention.

FIGS. 4(a) and (b) are views of an interconnect unit according to an alternative embodiment of the present invention; FIG. 4 (b) a top view at the fuel cell level.

DETAILED DESCRIPTION

Embodiments of the present invention may include a repeating fuel cell interconnect unit that may be stacked to form a fuel cell stack module. The interconnect unit may include a number of compartments and flow fields and a number of fuel cells arranged and aligned to form an array.

Figure 1A:
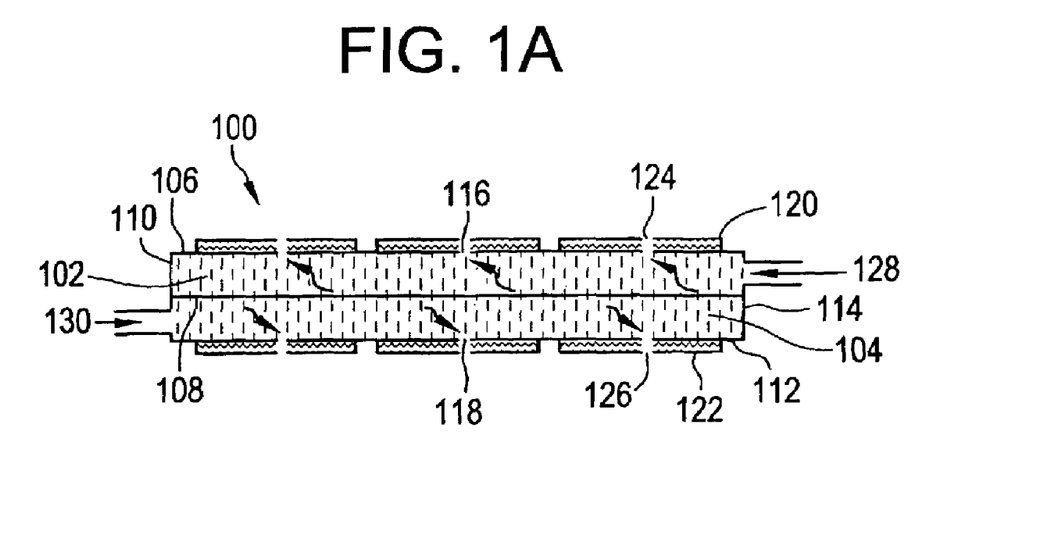
FIG. 1(a) demonstrates a section view.

Referring now to the figures, where the various numbers represent like parts throughout the several views, FIG. 1(a) demonstrates a section view of an interconnect unit 100 relating to an exemplary embodiment of the present invention. The interconnect unit may include a fuel compartment 102 adjacent to an air compartment 104. Being adjacent may mean that of the fuel compartment 102 and the air compartment 104 share a common side (as described below for the exemplary embodiment of interconnect unit 100), are connected in some fashion, or reside in close proximity to one another. The interconnect unit 100 may include three layers of sheet metal forming a fuel compartment 102 and an air compartment 104. The sheet metal may include stainless steel, high temperature alloys or similar materials. An outer fuel compartment layer 106, a middle layer 108, and a fuel compartment periphery ring 110 may bind the fuel compartment 102. The fuel compartment 102 may be cylindrically shaped with a height of approximately 0.1 to 1.0 centimeters and the diameter of approximately 10 to 100 centimeters, though these measurements may increase or decrease depending on the desired application of the fuel cell interconnect unit 100. An outer air compartment layer 112, the middle layer 108, and an air compartment periphery ring 114 may bind the air compartment 104. The middle layer 108 may be solid and thus separate the fuel compartment 102 from the air compartment 104. The air compartment 104 may be substantially the same size and shape as the fuel compartment 102.

The outer fuel compartment layer 106 may be connected to the middle layer 108 by the fuel compartment periphery ring 110 and a number of internal contact positions (not shown in FIG. 1(a)). The outer air compartment layer 112 may be similarly connected to the middle layer 108 by the air compartment periphery ring 114 and a number of internal contact positions (not shown in FIG. 1(a)).

On the outer fuel compartment layer 106, multiple fuel compartment orifices 116 may be formed through the sheet in any desired location, alignment, and dimension. On the outer air compartment layer 112, multiple air compartment orifices 118 may be formed through the sheet with similar relative locations, alignments, and dimensions as the fuel compartment orifices 116.

On the outer layer of each of the outer fuel compartment layer 106 and the outer air compartment layer 112, flow fields may be built around each single orifice 116, 118. The flow fields may be constructed of corrugated metal, porous metal, porous conductive ceramics or similar materials. The flow fields may be shaped so to possess a central symmetry and positioned such that each orifice is centrally located within the flow field. Multiple fuel flow fields 120 thus may be constructed around each of the fuel compartment orifices 116. Multiple air flow fields 122 may be similarly constructed around each of the air compartment orifices 118. In certain embodiments, the fuel flow fields 120 and the air flow fields 122 may be a cylindrically shaped with a height of approximately 0.1 to 1.0 centimeters and a diameter of approximately 10 to 100 centimeters, though these measurements may increase or decrease depending on the desired application of the fuel cell interconnect unit.

The fuel flow fields 120 may communicate with the fuel compartment 102 via the fuel compartment orifices 116, which may be a circular shaped opening with a diameter of approximately 0.1 to 1.0 centimeters, though the size of the opening may increase or decrease depending on the desired application of the fuel cell interconnect unit 100. A fuel outlet 124 may be formed on the outer circular face of each fuel flow field 120. Within each fuel flow field 120, the fuel outlet 124 may be aligned and dimensioned such that it directly opposes the fuel compartment orifice 116. Similarly, the air flow fields 122 may communicate with the air compartment 104 via the air compartment orifices 118. An air outlet 126 may be formed on the outer circular face of each air flow field 122. Within each air flow field 122, the air outlet 126 may be aligned and dimensioned such that it directly opposes the air compartment orifice 118.

The periphery rings 110, 114 of the fuel compartments 102 and the air compartments 104 may be solid except for openings for air and fuel feeds. The fuel compartment 102 thus may have a fuel feed 128 through the fuel compartment periphery ring 110. The air compartment 104 may have an air feed 130 through the air compartment periphery ring 114.

Figure 1B:
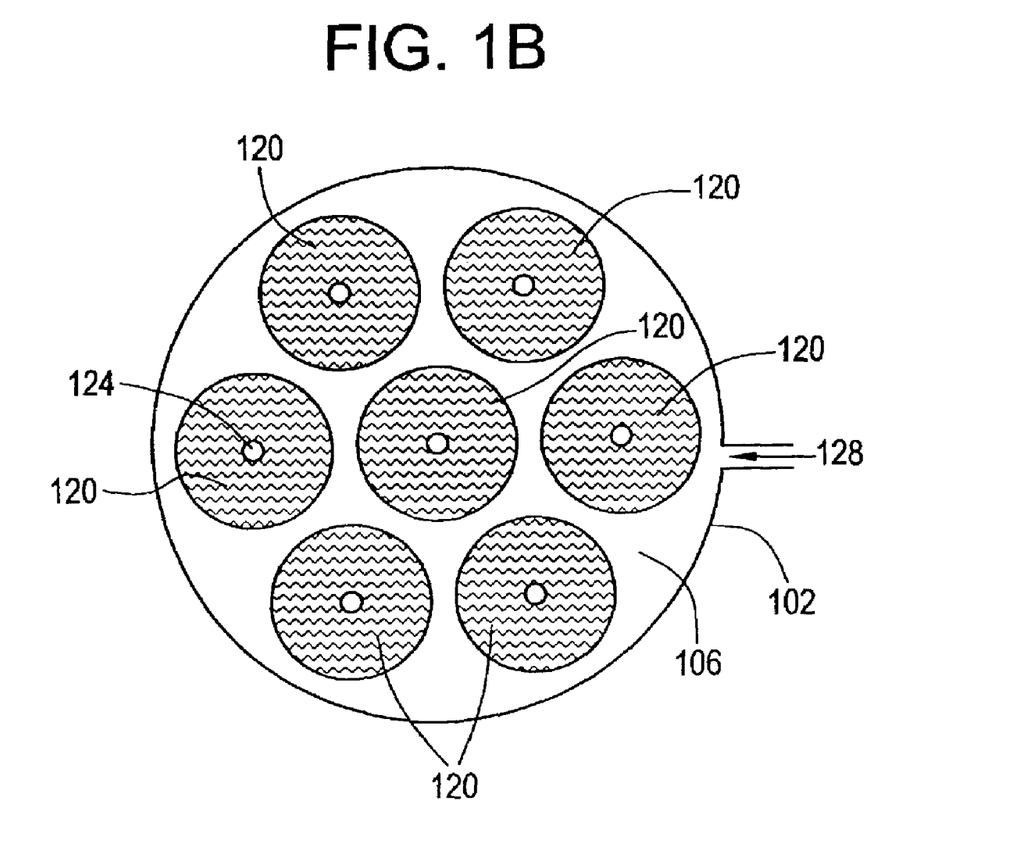
FIG. 1(b) a top view.

FIG. 1(b) demonstrates a top view of the exemplary interconnect unit 100. The fuel compartment 102 may be cylindrical, as stated, such that the outer fuel compartment layer 106 presents a circular face. Multiple fuel flow fields 120 may be positioned on the outer fuel cell compartment layer 106 to form an array. As used herein, an array shall mean a substantially regular grouping, or pattern, of elements. The fuel flow fields 120 may be cylindrical in shape, as stated, such that the outer face of the fuel flow fields 120 is circular.

The interconnect unit 100 may include a grouping of seven circular fuel flow fields 120 on the outer fuel compartment layer 106. The seven fuel flow fields 120 may be orientated such that a central fuel flow field 120 is surrounded by six periphery fuel flow fields 120 arranged in a circular pattern. The fuel flow fields 120 may be positioned in the array such that space is maintained between each. Space may further be maintained between the edge of the outer fuel compartment layer 106 and each fuel flow field 120. The fuel outlet 124 may be positioned in the center of the circular faces of the fuel flow fields 120. Any number of flow fields 120 may be used.

Figure 1C:
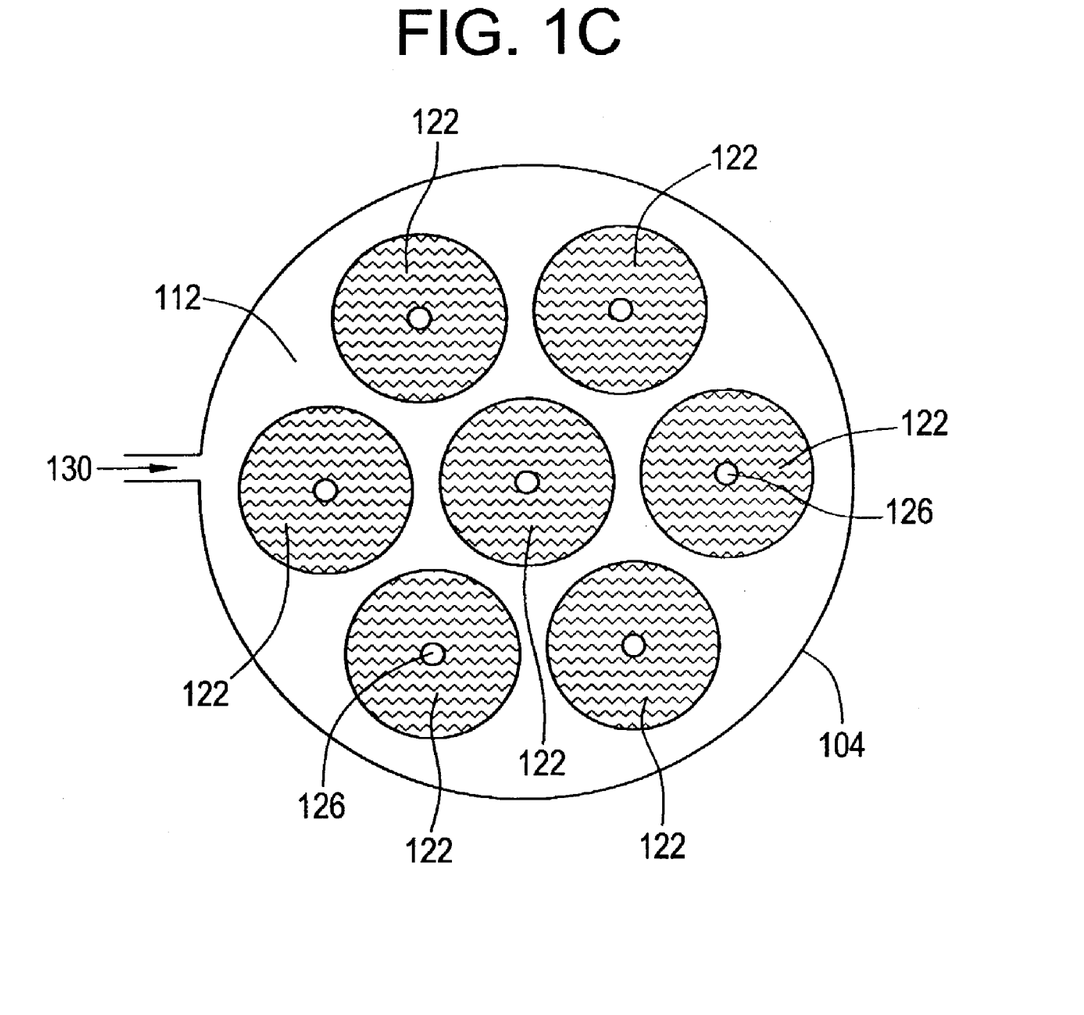
FIG. 1(c) a bottom view.

FIG. 1(c) demonstrates a bottom view of the exemplary interconnect unit 100. The air compartment 104 may be shaped and sized similarly to the fuel compartment 102, and thus also may present a circular face. Multiple air flow fields 122 may be positioned on the outer air compartment layer 112 to form substantially the same array as the fuel flow fields 120 form on the opposite side of interconnect unit 100. The air flow fields 122 may be sized and shaped similar to the fuel flow fields 120, and thus also may present an outer circular face. The air outlet 126 may be positioned in the center of the circular faces of the air flow fields 122. The shape, positioning, and arrangement of the fuel flow fields 120 and the air flow fields 122, and the sizing and positioning of the fuel outlet 124 and the air outlet 126 are exemplary only. As discussed in more detail below, other arrangements are possible and will become apparent to those skilled in the art.

Figure 2:
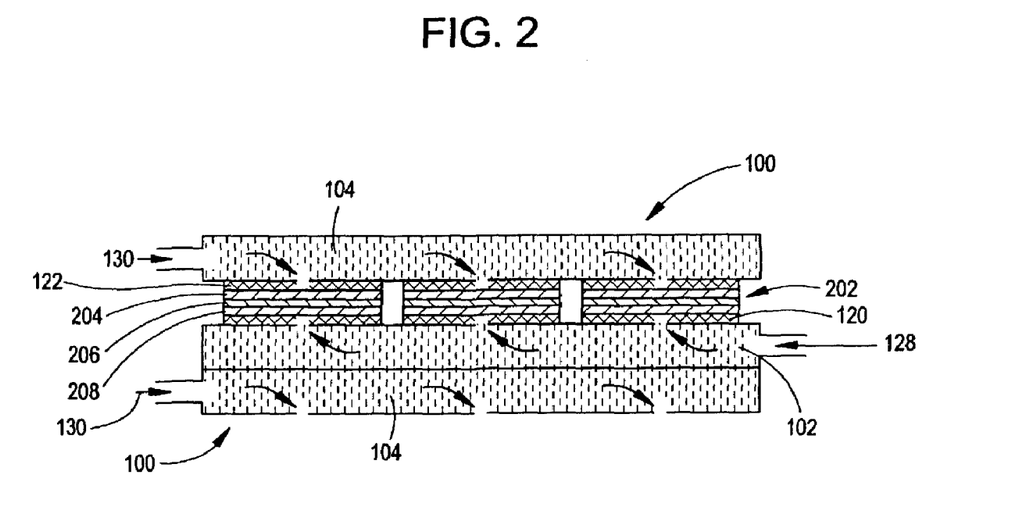
FIG. 2 is a section view demonstrating the stacking of multiple interconnect units according to certain embodiments of the present invention.

FIG. 2 is a section view demonstrating the stacking of multiple interconnect units 100. One or more of the interconnect units 100 may be stacked such that fuel flow fields 120 and air flow fields 122 from separate units oppose each other across a fuel cell 202. The fuel cell 202 may electrochemically react a supply of gas containing hydrogen with a supply of air to produce electricity. The fuel cell 202 may be cylindrically shaped such that the diameter of the cylinder substantially matches the diameter of the cylinders associated with the fuel flow field 120 and the air flow field 122.

The fuel cell 202 may include a fuel cell known in the art. For example, the fuel cell 202 may be a solid oxide fuel cell including an air electrode 204, an electrolyte 206, and a fuel electrode 208. The air electrode 204, also know as the cathode, may be made of a porous or dense material. By way of example, strontium-doped lanthanum manganite may be used. The electrolyte 206 may be a gas tight layer, which may be made from yttria-stabilized zirconia or other similar materials. The electrolyte 206 may cover the entire active surface of the air electrode 204. The fuel electrode 208, also known as the anode, may be made of a porous or dense material and may cover the opposite side of the electrolyte 206. The fuel electrode 208 may, by way of example, be made from nickel-zirconia cermet. Examples of suitable solid oxide fuel cells are disclosed in U.S. Pat. No. 5,589,017 (Minh), U.S. Pat. No. 6,270536 (Minh), and U.S. Pat. No. 6,291,089 (Piascik), each of which is hereby incorporated by reference in its entirety.

Figure 3:
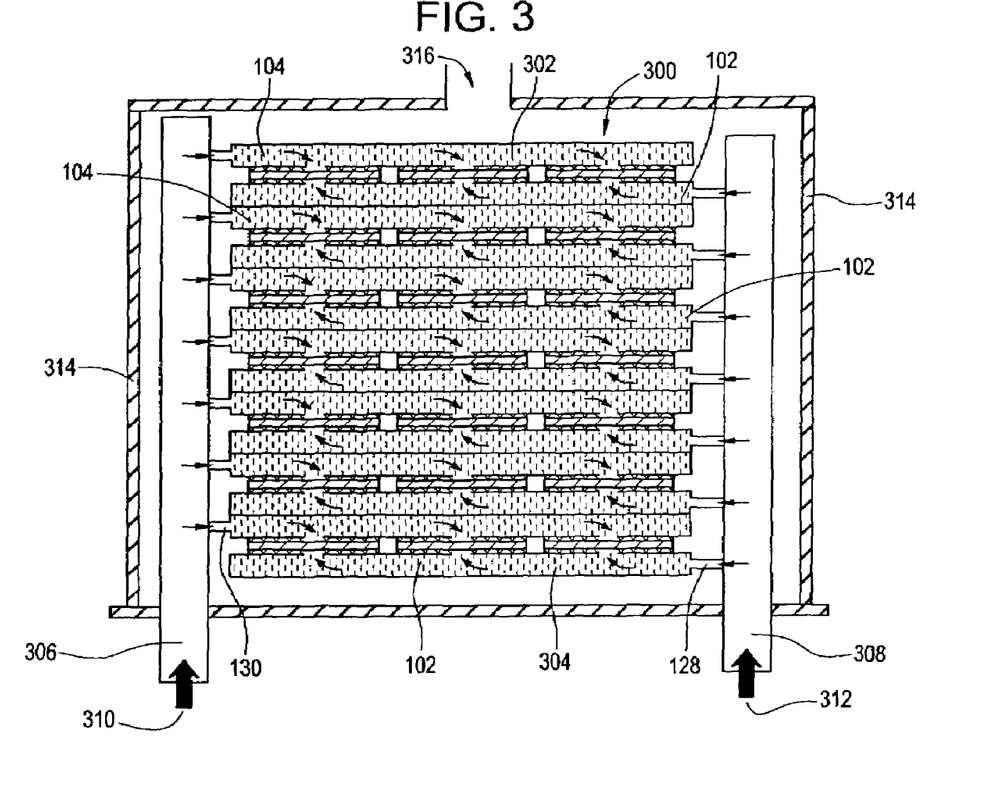
FIG. 3 is a section view demonstrating an exemplary stack module according to certain embodiments of the present invention.

FIG. 3 is a section view demonstrating an exemplary fuel cell stack module 300, i.e., the stacking of a number of the interconnect units 100. FIG. 3 further demonstrates an exemplary system of supplying air and fuel to the multiple interconnect units 100 of stack module 300. Other systems and methods to supply air to the multiple air feeds 130 and fuel to the multiple fuel feeds 128 will become apparent to those skilled in the art.

By way of example, the fuel cell stack 300 is shown with seven complete interconnect units 100. Depending on the application and demand for electricity production, this number can be increased or decreased providing for flexible scalability. A top interconnect unit 302 of the fuel cell stack 300 may include only the air compartment 104 with the adjoining air flow fields 122. Similarly, a bottom interconnect unit 304 of the fuel cell stack 300 may include only the fuel compartment 102 with the adjoining fuel flow fields 120. The top interconnect unit 302 and the bottom interconnect unit 304 may complete the repeating structure around each fuel cell 202 such that each cylindrical fuel cell 202 is sandwiched between one of the circular faces of the fuel flow fields 120 and one of the circular faces of the air flow fields 122. The fuel cell 202 may be bonded in place between the fuel flow field 120 and the air flow field 122 per methods known in the art. For example nickel oxide or similar bonding agents may be used. In alternative embodiments, the fuel cell 202 may be held in place by a clamping force on the fuel cell stack 300, which may act to compress the interconnect units 100 against each other.

As described, the air flow fields 122 and the fuel flow fields 120 may form substantially that same array pattern on the air compartment 104 and fuel compartment 102, respectively. Further, the air flow fields 122 and the fuel flow fields 120 may be substantially the same size and shape. The multiple interconnect units 100 thus may be stacked such that each of the air flow fields 122 of one interconnect unit 100 matches one of the fuel flow fields 120 of the neighboring interconnect unit. Thereby, each of the air flow fields 122 of one interconnect unit 100 may oppose one of the fuel flow fields 120 of the adjacent interconnect unit across the fuel cell 202. The interconnect units 100 may further be aligned within the fuel cell stack 300 such that the air feeds 130 associated with the several interconnect units 100 line-up on the same side of fuel cell stack 300. Accordingly, the fuel feeds 128, which may be located on the opposite side of interconnect unit 100, may line-up on the opposite side of fuel cell stack 300.

The fuel cell stack 300 further may include an air manifold 306 and a fuel manifold 308. The air manifold 306 may be an enclosed tube that connects to a supply of compressed air 310. The air manifold 306 may be constructed of high temperature alloys known in the art or similar materials. The air manifold 306 may run vertically along the periphery of the stack 300 and may make a connection to each of the air feeds 130 of the stacked interconnect units 100. The fuel manifold 308 also may be an enclosed tube that connects to a supply of fuel 312. The fuel manifold 308 may be constructed of high temperature alloys known in the art or similar materials. The fuel manifold 308 may run vertically along the periphery of the fuel cell stack module 300 and may make a connection to each of the fuel feeds 128 of the stacked interconnect units 100. The fuel cell stack 300 may further include an outer casing 314, which may provide exhaust collection and thermal insulation. The outer casing 314 also may be constructed of high temperature alloys known in the art or similar materials. An exhaust 316 may be in the form of an opening through the outer casing through which exhaust may escape.

Figure 4A:
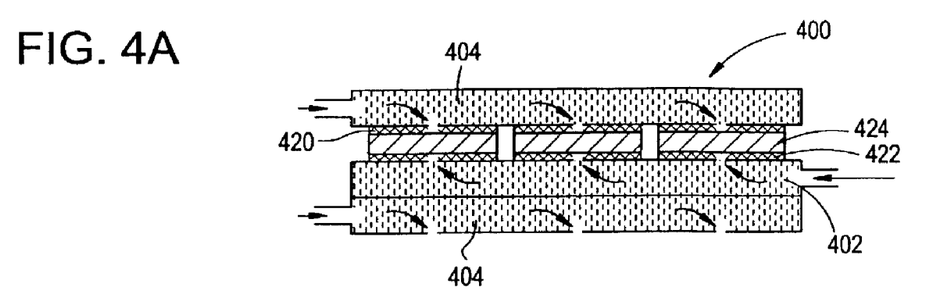
FIG. 4(a) demonstrates a section view.
Figure 4B:
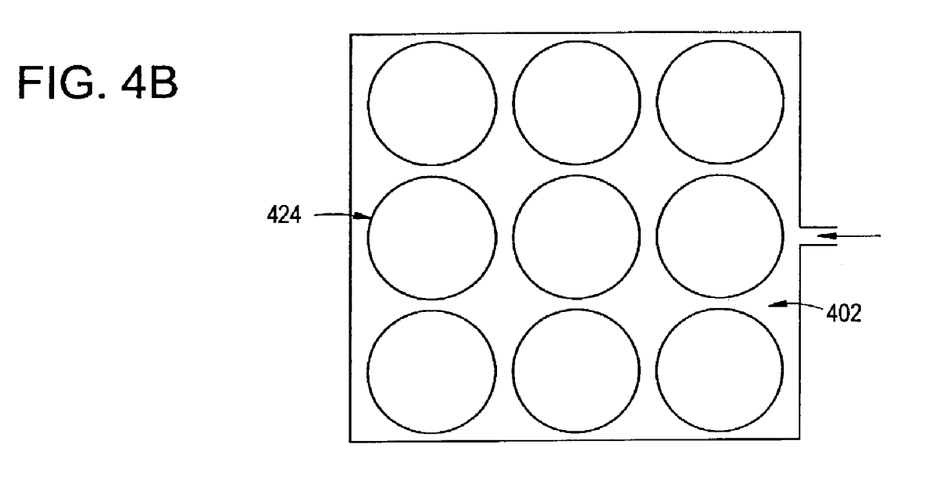

FIGS. 4(a) and (b) demonstrates another exemplary embodiment of the interconnect unit, an interconnect unit 400. As stated, the air compartment and fuel compartment of the interconnect unit of the current invention may take different shapes, for example, they may be circular, square, rectangular, hexagonal, triangle, or others. Further, the flow fields on the interconnect assembly may be one or multiple. In certain embodiments, the interconnect assembly may have a different number of different sized fuel flow fields and air flow fields. For example, a single, larger fuel flow field may be provided on an interconnect unit with multiple, smaller air flow fields. The flow fields also may take different shapes. For example, the flow fields may be circular, square, rectangular, hexagonal, triangle, or others.

In the interconnect unit 400, a fuel compartment 402 and an air compartment 404 may present a square face, as seen by the top view of FIG. 4(b). One or more fuel flow fields 420 may be cylindrically shaped and may be arranged in a three by three array. Space may be maintained between each fuel flow field 420 and the other fuel flow fields 420 of the array. Space may further be maintained between each fuel flow field 420 and the edge of the fuel compartment 402. One or more air flow fields 422 also may be cylindrical shaped and may be arranged in a similar three by three array. Space may be maintained between each air flow field 422 and the other air flow fields 422 of the array. Space may further be maintained between each air flow field 420 and the edge of the air compartment 404. A plurality of fuel cells 424 may be sandwiched between the air flow fields 422 and the fuel flow fields 420. This arrangement is exemplary only as other shapes of the air/fuel compartments 402, 404 and air and fuel flow fields 420, 422 will become apparent to those skilled in the art.

In use, referring again to FIGS. 1–3, the interconnect unit 100 and the fuel cell stack 300 may function as follows. The supply of compressed air 310 may be fed to the air manifold 306. Generally, the pressure of the compressed air may be approximately 10,000 to 1,500,000 N/m2 in the air manifold 306. The compressed air may or may not be pre-heated before entering the air manifold 306, as the compressed air may be heated in the interconnect unit 100 as described in more detail below. The supply of fuel 312 may be supplied to the fuel manifold 308. The supply of fuel 312 may be a hydrocarbon or oxygenated hydrocarbon fuel. For example, propane, methane, butane, gasoline, methanol, or other types of similar fuels may be used. The supply of fuel 312 may be compressed. Generally, the pressure of the compressed fuel 312 will be approximately 10,000 to 1,500,000 N/m2 in the fuel manifold 308. The compressed fuel 312 may or may not be preheated before entering the fuel manifold 308, as the compressed fuel may be heated in the interconnect unit 100 as described in more detail below. In the air manifold 306, the compressed air may receive heat from the combustion of unspent gaseous fuel taking place within the outer casing 314 as discussed in more detail below. Similarly, in the fuel manifold 308, the compressed fuel also may receive heat from the combustion of unspent gaseous fuel.

From the air manifold 306, the compressed air may enter the air compartments 104 of the multiple interconnect units 100 of the fuel cell stack 300 via the air feeds 130. Within the air compartment 104, the compressed air may further receive heat from the combustion of unspent gaseous fuel taking place within the outer casing 314. Within each interconnect unit 100, as previously described, the outer air compartment layer 112 may be connected to the middle layer 108 by a number of internal contacts. The internal contacts may be designed per methods known in the art to conduct heat from the outer air compartment layer 12 to increase the rate of heat transfer occurring between the combustion within the outer casing 314 and the compressed air moving through the air compartment 104. From the air compartment 104, the compressed air may move through the air compartment orifice 118 to the air flow field 122. The compressed air may then move through the air flow field 122 (further receiving heat from the combustion of the unspent gaseous fuel taking place in the outer casing 314) where it may be introduced to the air electrode 204 of the fuel cell 202. The compressed air may be introduced to the air electrode either through the air outlet 126 or through the porous surface of the air flow field 122. As such, the compressed air may be preheated before being introduced to the air electrode 204.

From the fuel manifold 308, the compressed fuel may enter the fuel compartments 102 of the multiple interconnect units 100 of the fuel cell stack 300 via the fuel feeds 128. Within the fuel compartment 102, the compressed fuel may further receive heat from the combustion of unspent gaseous fuel taking place within the outer casing 314. Within each interconnect unit 100, as previously described, the outer fuel compartment layer 106 may be connected to the middle layer 108 by a number of internal contacts. The internal contacts may be designed per methods known in the art to conduct heat from the outer fuel compartment layer 106 to increase the rate of heat transfer occurring between the combustion within the outer casing 314 and the compressed fuel moving through the fuel compartment 102. In addition, heat flow between the fuel compartment 102 and the air compartment 104 may occur across the middle layer 108. For example, if the supply of compressed air 310 were preheated before entering the air manifold 306 (for example, a cross-flow heat exchanger may be used to exchange heat between the exhaust of the fuel cell stack 300 and the supply of compressed air 310 before delivery to the air manifold 306), the compressed air in the compartment 104 may provide heat to the compressed fuel in the fuel compartment 102 via the common surface of the middle layer 108.

The heat provided to the fuel compartment 102 (via the heating from the combustion of unspent gaseous fuel taking place with the outer casing 314, the exchange of heat from the air compartment 104, and/or the exchange of heat from the electrochemical reaction taking place within the fuel cell 202) may be used to reform the compressed fuel 312 per methods known in the art. In the fuel compartment 102, the inner walls and the multiple contacts between the middle layer 108 and the outer fuel compartment layer 106 may be catalytically treated. Such catalysts and promoters may be loaded via sol-gel, co-precipitation, or similar methods known in the art. Thus, the compressed fuel may be introduced in the fuel compartment 102 to the necessary heat and the desired catalysts and promoters to promote and maintain reformation, i.e., the process wherein gaseous hydrocarbons are reformed in the presence of heat and a catalyst into a gas containing hydrogen and carbon monoxide. Under these conditions, the compressed fuel 312 may be partially reformed.

From the fuel compartment 102, the supply of partially reformed fuel may move through the fuel compartment orifice 116 to the fuel flow field 120. The compressed fuel may then move through the fuel flow field 120 (further receiving heat from the combustion of the unspent gaseous fuel taking place in the outer casing 314 to promote further reformation) where it may be introduced to the fuel electrode 208 of the fuel cell 202. The compressed fuel may be introduced to the air electrode either through the fuel outlet 124 or through the porous surface of the fuel flow field 120.

As such, the partially reformed supply of compressed fuel may arrive at the fuel electrode 208, or anode. As stated, the fuel outlet 124 may be located in the center of the fuel flow field 120 such that the partially reformed supply of compressed fuel is first introduced into the center of the fuel electrode 208. As described above, the supply of compressed fuel also may be introduced into the fuel electrode 208 through the porous surface of the fuel flow field 120. The partially reformed supply of compressed fuel may move through the porous material of the fuel electrode 208 and contact the electrolyte 206. At the interface between the fuel electrode 208 and the electrolyte 206, the hydrogen may react with oxygen ions from the electrolyte, thereby releasing electrons to the external circuit and generating heat. On the other side of the fuel cell, the preheated supply of compressed air may be fed to the air electrode 204, or cathode. The air outlet 126 may be located in the center of the air flow field 122 such that the preheated supply of compressed air may be first introduced into the center of the air electrode 206. As described above, the supply of compressed air also may be introduced into the air electrode 206 through the porous surface of the fuel flow field 120. The supply of compressed air may move through the porous material of the air electrode 204 and contact the electrolyte 206, where it may supply the oxygen ions for the electrolyte by accepting electrons from the external circuit. The electrolyte may conduct these ions between the air and fuel electrodes 206, 208, maintaining overall electrical charge balance. The flow of electrons in the external circuit may provide useful power. The multiple fuel cells 202 between two interconnect units 100 may be connected in parallel as they share a common side on each interconnect unit 100. As such, the failure of one cell will not disable the functioning of the other cells of the array. The successive interconnect units 100 may be connected in series such that larger stacks, i.e., the stacking of more interconnect units 100, may provide for greater power generation capabilities.

Reaction products from the electrochemical reaction on the anode side of the fuel cell 202 include CO2, H2O and unreacted gaseous fuel. Typically unreacted gaseous fuel remains in the reaction product of the anode because, as stated, the reformation process in the fuel reformation process generally does not reform all of the supplied fuel. The anode reaction products may escape through the outer edges of the fuel flow field 120 and the porous material of the fuel electrode 208. The release of anode products may be substantially uniform around the outer edge of the fuel flow field 120 and the fuel electrode 208. In regard to the fuel flow field 120, this may occur because of the cylindrical shape of the fuel flow field 120 (i.e., the central symmetry of its circular cross-section), the fact that the partially reformed supply of compressed fuel is introduced at the center of the fuel flow field 120, and the consistent nature and thickness of its porous surface. Similarly, in regard to the fuel electrode 208, this may occur because of the cylindrical shape of the fuel electrode 208 (i.e., the central symmetry of its circular cross-section), the fact that the partially reformed supply of compressed fuel is introduced toward the center of the fuel electrode 208, and the consistency of the porous material from which it is constructed. As such, the non-reacted fuel may be released uniformly around the outer exposed surfaces of the fuel flow field 120 and the fuel electrode 208.

Reaction products from the cathode side may include excess air, as the fuel cell 202 generally does not react all of the preheated supply of compressed air supplied to the air electrode 204. Like the release of anode reaction products, the release of the cathode reaction products may be substantially uniform around the outer edge of the air flow field 122 and the air electrode 204. In regard to the air flow field 122, this may occur because of the cylindrical shape of the air flow field 122 (i.e., the central symmetry of its circular cross-section), the fact that the supply of compressed air is introduced at the center of the air flow field 122, and the consistent nature and thickness of its porous surface. Similarly, in regard to the air electrode 204, this may occur because of the cylindrical shape of the air electrode 204 (i.e., the central symmetry of its circular cross-section), the fact that the supply of compressed air is introduced toward the center of the air electrode 204, and the consistency of the porous material from which it is constructed. As such, excess air may be released uniformly around the outer exposed surfaces of the air flow field 122 and the air electrode 204.

The reaction products of the cathode and anode may then mix around the periphery of the fuel cells 202 and the flow fields. The excess hot air of the cathode reaction products may then combust the unreacted fuel of the anode reaction products. The gap between each of the fuel cells 202 on the same interconnect unit 100 may be designed so that the depleted air and fuel from each of the fuel cells 202 the flow fields may completely combust around the periphery of the fuel cells 202. The combustion products may flow through the space or gaps among the fuel cells 202 toward the outside of the interconnect assembly and directly heating the fuel flow and air flow fields 120, 122, as well as the outer surfaces of the fuel and air compartment 102, 104, thereby heating the fuel and air contained therein. Finally, the combustion products will flow out from the periphery of the fuel cell stack 300 where they may provide heat to the air and fuel manifold 306, 308, and then exit via exhaust 316. Thus, all of the heat sources, i.e., the combustion, the electrochemical reaction, and internal cell/interconnect resistance, may be efficiently exchanged to preheat the air supply and promote/maintain fuel reformation in the interconnect units 100.

Therefore, the foregoing is considered as illustrative only of the principles of the invention. The features and aspects of the present invention have been described or depicted by way of example only and are therefore not intended to be interpreted as required or essential elements of the invention. It should be understood that the foregoing relates only to certain exemplary embodiments of the invention, and that numerous changes and additions may be made thereto without departing from the spirit and scope of the invention as defined by the appended claims and equivalents thereof.

We claim:

1. A fuel cell interconnect unit, comprising:
   a fuel compartment;
   an air compartment, said air compartment being adjacent to said fuel compartment;
   a plurality of fuel flow fields, each of said plurality of fuel flow fields in communication with said fuel compartment; and
   a plurality of air flow fields, each of said plurality of air flow fields in communication with said air compartment;
   wherein said air compartment and said fuel compartment comprise a common side; and
   wherein said plurality of fuel flow fields comprises an array on said fuel compartment and said plurality of air flow fields comprises said array on said air compartment such that each of said plurality of air flow fields aligns with one of said plurality of fuel flow fields.

2. The fuel cell interconnect unit of claim 1, further comprising an open area maintained between each of said plurality of fuel flow fields of said array.

3. The fuel cell interconnect unit of claim 1, wherein each of said plurality of air flow fields and each of said plurality of fuel flow fields comprise the same shape.

4. The fuel cell interconnect unit of claim 1, wherein an inner surface of said fuel compartment comprises catalysts to promote fuel reformation.

5. The fuel cell interconnect unit of claim 1, wherein said fuel compartment comprises a first cylinder;
   wherein said air compartment comprises a second cylinder, said common side comprising a first end of said first cylinder and said second cylinder;
   wherein said plurality of fuel flow fields are fixed to an outer surface of said fuel compartment, said outer surface of the fuel compartment being a second end of said first cylinder; and
   wherein said plurality of air flow fields are fixed to an outer surface of said air compartment, said outer surface of the air compartment being a second end of said second cylinder.

6. The fuel cell interconnect unit of claim 5, wherein each of said plurality of air flow fields and each of said plurality of fuel flow fields comprise a cylinder.

7. The fuel cell interconnect unit of claim 6, wherein each of said plurality of air flow fields further comprises an air outlet, each of said air outlets being located in the center of an outer face of each of said plurality of air flow fields; and
   wherein each of said plurality of fuel flow fields further comprises a fuel outlet, each of said fuel outlets being located in the center of an outer face of each of said plurality of fuel flow fields.

8. The fuel cell interconnect unit of claim 7, wherein each of said plurality of air flow fields is in communication with said air compartment via an air orifice, said air orifices being located in the center of an inner face of each of said plurality of air flow fields; and
   wherein each of said plurality of fuel flow fields is in communication with said fuel compartment via a fuel orifice, said fuel orifices being located in the center of an inner face of each of said plurality of fuel flow fields.

9. The fuel cell interconnect unit of claim 1, wherein each of said plurality of fuel flow fields comprises a porous material; and
   wherein each of said plurality of air flow fields comprises a porous material.

* * * * *